(12) United States Patent
Tanaya et al.

(10) Patent No.: US 7,624,619 B2
(45) Date of Patent: Dec. 1, 2009

(54) KNOCKING DETECTING DEVICE FOR AN INTERNAL COMBUSTION ENGINE

(75) Inventors: Kimihiko Tanaya, Chiyoda-ku (JP); Takahiko Inada, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 76 days.

(21) Appl. No.: 11/945,777

(22) Filed: Nov. 27, 2007

(65) Prior Publication Data

US 2008/0276689 A1   Nov. 13, 2008

(30) Foreign Application Priority Data

May 11, 2007   (JP) ............................... 2007-126852

(51) Int. Cl.
*G01L 23/22* (2006.01)

(52) U.S. Cl. ..................................... 73/35.09; 73/35.04

(58) Field of Classification Search ................ 73/35.01, 73/35.03, 35.04, 35.06, 35.07, 35.08, 35.09, 73/35.11

See application file for complete search history.

(56) References Cited

U.S. PATENT DOCUMENTS 4,899,710 A * 2/1990 Takahashi .............. 123/406.35

6,789,409 B2 * 9/2004 Tanaya ....................... 73/35.08
7,424,820 B2 * 9/2008 Iwade et al. ................ 73/35.01
7,478,624 B2 * 1/2009 Kaneko et al. ......... 123/406.37

FOREIGN PATENT DOCUMENTS

| JP | 01-178770 | * | 7/1989 |
| JP | 04-076249 | * | 3/1992 |
| JP | 05-033716 A | | 2/1993 |
| JP | 2684611 B2 | | 2/1998 |
| JP | 2004-138032 | * | 5/2004 |

* cited by examiner

*Primary Examiner*—Helen C. Kwok
(74) *Attorney, Agent, or Firm*—Sughrue Mion, PLLC (57) ABSTRACT

The present invention relates to a knocking detecting device for an internal combustion engine, for controlling a timing at which an ignition coil is actuated according to a knocking occurrence intensity, the knocking detecting device including the signal processing module for processing a signal attributable to knocking occurring in the operation of the internal combustion engine to determine a knocking occurrence intensity, in which the signal processing module includes: signal detecting means for detecting a signal attributable to knocking; frequency intensity calculating means for selecting a plurality of frequencies extracted from an output of the signal detecting means to calculate a frequency intensity; and knocking intensity determining means for finally determining that knocking occurs in a case where it is determined that at least two primary determination results of among a plurality of primary knocking determination results based on the outputs of the frequency intensity calculating means.

16 Claims, 8 Drawing Sheets

| DATA NUMBER | cos | sin | DATA NUMBER | cos | sin |
|---|---|---|---|---|---|
| 0 | 1 | 0 | 31 | 0.383 | -0.924 |
| 1 | 0.383 | 0.924 | 32 | 1 | 0 |
| 2 | -0.707 | 0.707 | 33 | 0.383 | 0.924 |
| 3 | -0.924 | -0.383 | 34 | -0.707 | 0.707 |
| 4 | 0 | -1 | 35 | -0.924 | -0.383 |
| 5 | 0.924 | -0.383 | 36 | 0 | -1 |
| 6 | 0.707 | 0.707 | 37 | 0.924 | -0.383 |
| 7 | -0.383 | 0.924 | 38 | 0.707 | 0.707 |
| 8 | -1 | 0 | 39 | -0.383 | 0.924 |
| 9 | -0.383 | -0.924 | 40 | -1 | 0 |
| 10 | 0.707 | -0.707 | 41 | -0.383 | -0.924 |
| 11 | 0.924 | 0.383 | 42 | 0.707 | -0.707 |
| 12 | 0 | 1 | 43 | 0.924 | 0.383 |
| 13 | -0.924 | 0.383 | 44 | 0 | 1 |
| 14 | -0.707 | -0.707 | 45 | -0.924 | 0.383 |
| 15 | 0.383 | -0.924 | 46 | -0.707 | -0.707 |
| 16 | 1 | 0 | 47 | 0.383 | -0.924 |
| 17 | 0.383 | 0.924 | 48 | 1 | 0 |
| 18 | -0.707 | 0.707 | 49 | 0.383 | 0.924 |
| 19 | -0.924 | -0.383 | 50 | -0.707 | 0.707 |
| 20 | 0 | -1 | 51 | -0.924 | -0.383 |
| 21 | 0.924 | -0.383 | 52 | 0 | -1 |
| 22 | 0.707 | 0.707 | 53 | 0.924 | -0.383 |
| 23 | -0.383 | 0.924 | 54 | 0.707 | 0.707 |
| 24 | -1 | 0 | 55 | -0.383 | 0.924 |
| 25 | -0.383 | -0.924 | 56 | -1 | 0 |
| 26 | 0.707 | -0.707 | 57 | -0.383 | -0.924 |
| 27 | 0.924 | 0.383 | 58 | 0.707 | -0.707 |
| 28 | 0 | 1 | 59 | 0.924 | 0.383 |
| 29 | -0.924 | 0.383 | 60 | 0 | 1 |
| 30 | -0.707 | -0.707 | 61 | -0.924 | 0.383 |
|  |  |  | 62 | -0.707 | -0.707 |
|  |  |  | 63 | 0.383 | -0.924 |

FIG. 10

| FREQUENCY | k | NUMBERS |
|---:|---:|---:|
| 0 | 0 | 64 |
| 625 | 1 | 2 |
| 1250 | 2 | 4 |
| 1875 | 3 | 2 |
| 2500 | 4 | 8 |
| 2925 | 5 | 2 |
| 3750 | 6 | 4 |
| 4375 | 7 | 2 |
| 5000 | 8 | 16 |
| 5625 | 9 | 2 |
| 6250 | 10 | 4 |
| 6875 | 11 | 2 |
| 7500 | 12 | 8 |
| 8125 | 13 | 2 |
| 8750 | 14 | 4 |
| 9375 | 15 | 2 |
| 10000 | 16 | 32 |
| 10625 | 17 | 2 |
| 11250 | 18 | 4 |
| 11875 | 19 | 2 |
| 12500 | 20 | 8 |
| 13125 | 21 | 2 |
| 13750 | 22 | 4 |
| 14375 | 23 | 2 |
| 15000 | 24 | 16 |
| 15625 | 25 | 2 |
| 16250 | 26 | 4 |
| 16875 | 27 | 2 |
| 17500 | 28 | 8 |
| 18125 | 29 | 2 |
| 18750 | 30 | 4 |
| 19375 | 31 | 2 |
| 20000 | 32 | 64 |

FIG. 11

KNOCKING DETECTING DEVICE FOR AN INTERNAL COMBUSTION ENGINE

BACKGROUND OF THE INVENTION

1. Field of the Invention

The present invention relates to a knocking detecting device for an internal combustion engine which detects knocking in which abnormal combustion is occurred in the internal combustion engine, and more particularly to an improvement in the knocking detection precision for further improving the operation efficiency of the internal combustion engine.

2. Description of the Related Art

In the automobile industry, particularly in a field that uses the internal combustion engine, demands from users for high power engines are increasing, whereas there are demands for exhaust (emission) gas reduction from environment viewpoints. Expectation to develop a technique capable of satisfying both demands is growing rapidly in recent years.

In order to satisfy those demands, various technologies have been developed, in which there are tendencies that the combustion efficiency is enhanced to the maximum, to thereby provide a common solution to both conflicting requirements.

However, the possibility that the abnormal combustion which is called "knocking (knock)" occurs becomes higher as the combustion efficiency is made higher. The knocking is considered as an abnormal self ignition phenomenon that occurs in cylinders of the engine, and the occurrence of the knocking may cause the engine to be damaged, which is to be avoided.

Accordingly, in order to enhance the combustion efficiency, a technology to avoid the knocking is required, and a development of a knocking detection technology with higher precision has been required.

Up to now, a large number of knocking detecting methods have been proposed, and as a representative method, there is proposed a device for detecting knocking using vibration frequency of the engine (for example, refer to Japanese Patent No. 2684611). The knocking detecting device detects resonance frequencies within two or more cylinders to obtain a knocking indicator based on the sum of those resonance frequency components.

However, some resonance frequencies occur without attributing to the occurrence of knocking. A representative example thereof is a "$\rho_{10}$ mode resonance frequency component," which is described in Japanese Patent No. 2684611.

In a case where the degree of disturbance within a combustion chamber which is induced by knocking is defined as the intensity of knocking, the magnitude of the $\rho_{10}$ mode resonance frequency component can be said as precisely expressing the knocking intensity. On the contrary, there arises such a problem that the $\rho_{10}$ mode resonance frequency component is the lowest resonance vibration mode within the engine combustion chamber, and readily occurs by merely giving a small energy.

That is, the vibration is caused by not knocking but some disturbance of combustion, and it is impossible to discriminate whether knocking occurs, or not, according to the resonance vibration. For example, there has been known that the $\rho_{10}$ mode resonance frequency component frequently occurs in an excessive air-fuel ratio rich state or at the time of ignition at an excessive spark delay position. Also, there are many examples in which such a $\rho_{10}$ mode resonance frequency component always occurs.

From the above-mentioned viewpoints, there arises such a problem that it is difficult to separate the $\rho_{10}$ mode resonance frequency components from noises in the knocking indicator taking the sum including the $\rho_{10}$ mode resonance frequency components.

On the contrary, a large energy is required to generate higher-order resonance vibrations than the $\rho_{10}$ mode resonance frequency components within the combustion chamber. Therefore, because the higher-order resonance vibrations do not easily occur, there has been known that the higher-order resonance vibrations precisely indicate whether knocking occurs, or not. As a result, there are many knocking detecting devices that mainly use the higher-order resonance vibrations.

However, because the frequencies of the higher-order resonance vibrations are close to the resonance vibration frequencies of an engine block, those knocking detecting devices suffer from a large number of problems. That is, it is difficult to separate the higher-order resonance vibrations from the resonance vibration frequency of the engine block, and from impulse noises, and the attenuation of a signal is quick because of unstable resonance vibrations. Also, the quantity of frequency shift due to a change in temperature or state within the combustion chamber is large, and it is difficult to ensure the signal level. Those problems induce barriers for achieving the required knocking detection precision.

SUMMARY OF THE INVENTION

The present invention has been made to solve the above-mentioned problems, and therefore an object of the present invention is to provide a knocking detecting device for an internal combustion engine capable of discriminating the occurrence of knocking with high precision.

To solve the above-mentioned problems, according to the present invention, there is provided a knocking detecting device for an internal combustion engine, including a signal processing module for processing a signal attributable to knocking occurring in operation of an internal combustion engine, determining a knocking occurrence intensity, and for outputting a determination result to control a timing at which an ignition coil is actuated based on the knocking occurrence intensity determined by the signal processing module, to thereby control an ignition timing at which a fuel-air mixture within a combustion chamber is ignited so as to suppress the occurrence of knocking. In the knocking detecting device, the signal processing module includes: signal detecting means for detecting a signal attributable to knocking that occurs in the operation of the internal combustion engine; frequency intensity calculating means for selecting a plurality of frequencies extracted from an output of the signal detecting means to calculate a frequency intensity; and knocking intensity determining means for finally determining that knocking occurs in a case where it is determined that at least two primary determination results of among a plurality of primary knocking determination results obtained in the frequency bands, respectively, based on the outputs of the frequency intensity calculating means indicate a possibility of knocking occurrence.

According to the present invention, in a case where the frequency intensities of a plurality of knocking frequency bands are calculated, and it is determined that at least two primary determination results have the possibility of occurrence of knocking from a plurality of primary knocking determination results which are obtained by the respective frequency bands, it is finally determined that knocking occurs, thereby enabling the occurrence of knocking to be discriminated with high precision.

DETAILED DESCRIPTION OF THE PREFERRED EMBODIMENTS

First Embodiment

Figure 1:
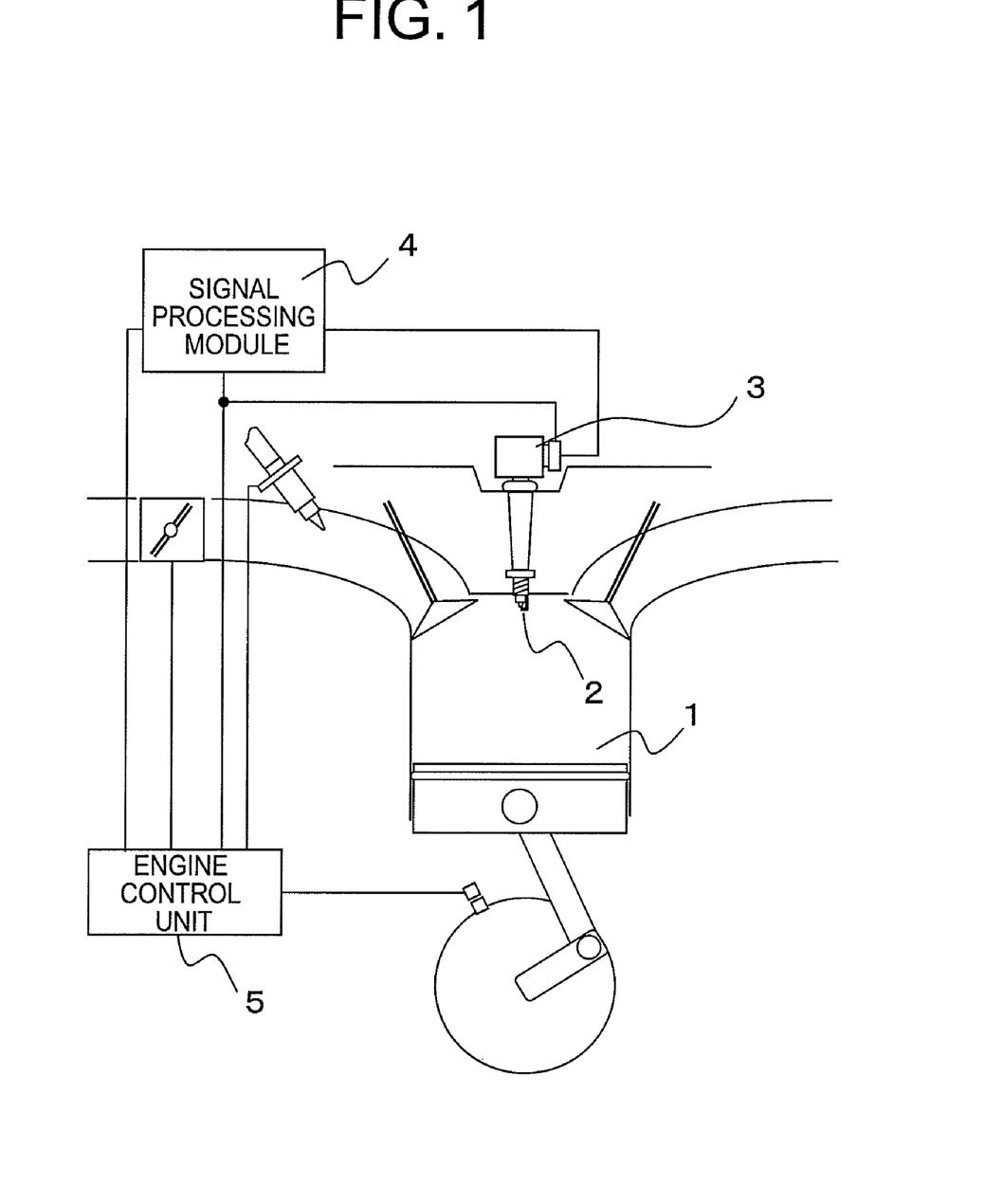
FIG. 1 is a block diagram schematically showing an overall configuration of a knocking detecting device for an internal combustion engine according to the present invention.

FIG. 1 is a block diagram showing an overall configuration of a knocking detecting device for an internal combustion engine according to the present invention. Referring to FIG. 1, a fuel-air mixture of a fuel is supplied to a combustion chamber 1, and at the same time, a high voltage is developed by an ignition coil 3, and a spark discharge is generated between electrodes of a spark plug 2, thereby making it possible to generate combustion within the combustion chamber 1 and generate a power in the internal combustion engine.

Ions are generated with the combustion within the combustion chamber 1. The spark coil 3 supplies a high voltage for generating the spark discharge between the electrodes of the spark plug 2. After the completion of supply of the high voltage, the ignition coil 3 further supplies a bias voltage for detecting the ions between electrodes. When a bias voltage is applied between electrodes of the spark plug 2, the ions that are generated with the combustion can be treated as a current, which is called "ion current".

The ion current flows into an engine block from a bias voltage source within the ignition coil 3 through the spark plug 2 with ions within the combustion chamber 1 as a medium. An ion current that is equivalent to the ion current described above flows toward the ignition coil 3 from a signal processing module 4 by a current mirror circuit (not shown). The ion current that flow in that section can be set to the amount of current which increases by constant times as much as the ion current amount that actually occurs to increase tolerance to noise and the like. The ion current is taken into a microprocessor through an A/D converter after being converted into a voltage by means of an interface within the signal processing module 4.

The signal processing module 4 processes the taken ion current signal to determine the knocking occurrence intensity, and transmits the determination result to an engine control unit (ECU) 5. The ECU 5 has a system configuration so as to control a timing at which the ignition coil 3 operates according to the obtained knocking occurrence intensity to control an ignition timing at which the fuel-air mixture within the combustion chamber 1 is ignited, control the occurrence of knocking, and suppress the occurrence of knocking.

Subsequently, a description will be given of a flow of obtaining the knocking occurrence intensity from the ion current in the interior of the signal processing module 4 with reference to a flowchart shown in FIG. 2. In the flowchart shown in FIG. 2, the signal processing module 4 first sets a detection window for analyzing a frequency on the taken ion current waveform in Step S21. Subsequently, in Step S22, the signal processing module 4 analyzes the frequency within the detection window, and determines the knocking intensity on the basis of the frequency analysis in Step S23.

In this example, in Step S21, a signal attributable to knocking that occurs during the operation of the internal combustion engine is detected. There is provided the ignition coil 3 that detects the ion current which is generated together with the combustion within the combustion chamber 1 by applying a bias voltage between the electrodes of the ignition plug 2 without provision of signal detecting means for setting the detection window in this situation. The ion current is regarded as a signal attributable to knocking. Also, in Step S22, frequency intensity calculating means selects a plurality of frequencies that are extracted from the detection output of the signal attributable to knocking to calculate the frequency intensity of the selected frequency. Also, in Step S23, knocking intensity determining means finally determines the knocking occurrence in the case where it is determined on the basis of the frequency intensity calculation result that at least two primary determination results from the plurality of primary knocking determination results that are obtained in the respective frequencies, respectively, have the possibility of the knocking occurrence.

Figure 3:
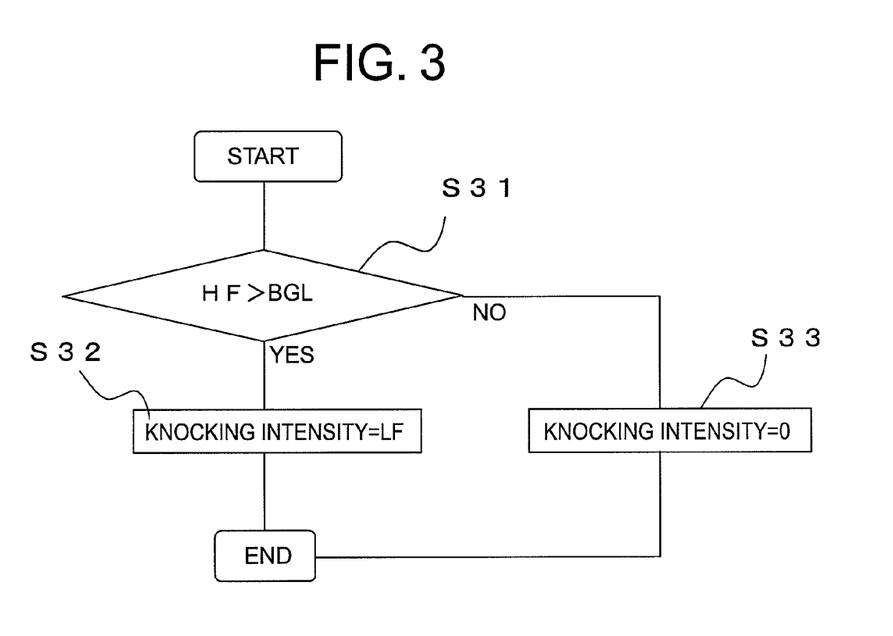
FIG. 3 is a flowchart for explaining a method of determining the knocking intensity (a method of determining the knocking intensity shown in FIG. 2) according to the first embodiment of the present invention.

A description will be given of a method of determining the knocking intensity in Step S23 further with reference to a flowchart shown in FIG. 3. In FIG. 3, it is confirmed whether a signal output HF of a high frequency band occurs at a level that can be determined as knocking, or not. In the case where the signal output HF occurs at that level, the final determination of the knocking occurrence is entrusted to a signal output LF of a low frequency band, that is, the knocking determination is conducted only when determinations of both of the high frequency band and the low frequency band are true.

More specifically, in Step S31, it is determined whether the signal output HF of the high frequency band exceeds a background level BGL, or not, and when the result is yes, the processing is advanced to Step S32 to select LF as the knocking intensity. On the other hand, when the result in Step S31 is no, the processing is advanced to Step S33 and the knocking intensity becomes 0. In this example, the knocking intensity is 0 in Step S33. However, it is unnecessary that the knocking intensity be 0, and the knocking intensity can be a given value of the degree that is not determined as knocking, or HF can be selected as the knocking intensity.

Figure 4:
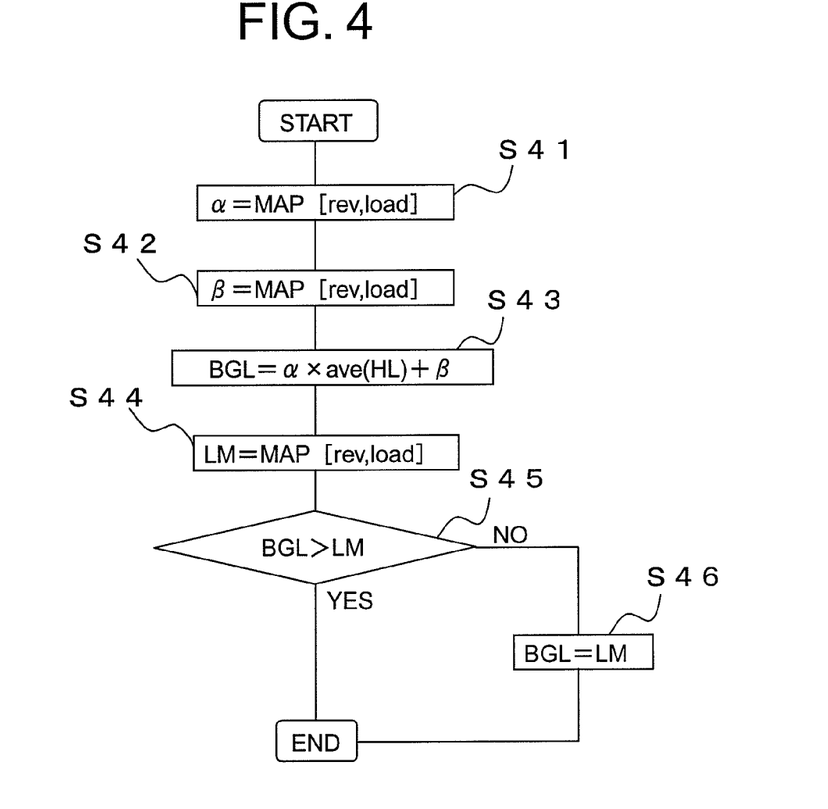
FIG. 4 is a flowchart for explaining a method of calculating a background level BGL used for knocking determination according to the first embodiment of the present invention.

As shown in a flowchart of FIG. 4, the background level BGL can be expressed by Expression (1) below by the aid of a coefficient α that is set as a map value of a revolution speed "rev" and a load "load" in an average value "ave" (HF) of the signal output HF of the high frequency band, and likewise an offset amount β that is set as a map value of the revolution speed "rev" and the load "load" (Steps S41 to S43).

$$BGL = \alpha \times ave(HF) + \beta \tag{1}$$

Also, the ave (HF) represents the average level of the signals of the high frequency band, and can be represented by Expression (2) below on the basis of a relationship between an average value $ave_t$ (HF) at the present time and an average value $ave_{t-1}$(HF) at the previous time by the aid of a coefficient γ that can be expressed by $0 \leq \gamma \leq 1$.

$$ave_t(HF) = ave_{t-1}(HF) \times \gamma + HF \times (1-\gamma) \tag{2}$$

Figure 5:
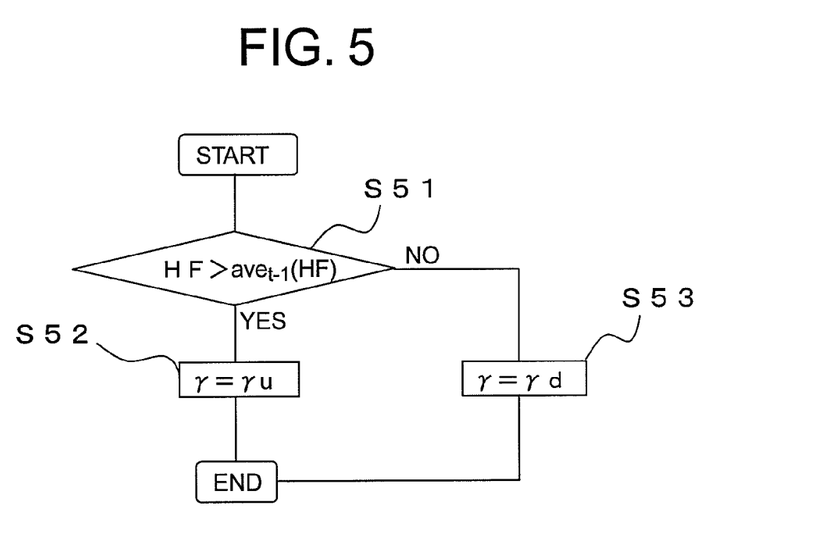
FIG. 5 is a flowchart for explaining a method of calculating a BGL coefficient according to the first embodiment of the present invention.

In a case where the average level ave (HF) of the signals of the high frequency band increases, that is, in a case where the signal output HF of the high frequency band is larger than the average value $ave_{t-1}$ (HF) at the previous time (HF>$ave_{t-1}$ (HF)) with respect to the coefficient γ as shown in a flowchart of FIG. 5, the processing is advanced to Step S52, and a coefficient γu is taken. Conversely, in a case where the average level ave (HF) is maintained or decreases, a coefficient γd is taken (Steps S51 to S53). In the first embodiment, those coefficients have the following relationship as represented by Expression (3) below, and suppress the unnecessary deterioration of the background level BGL).

$$\gamma u > \gamma d \tag{3}$$

Also, referring to FIG. 4 again, a lower limit value LM that is defined as the map value of the revolution speed "rev" and the load "load" is set to a background level BGL represented by Expression (1) above. In a case where the background level BGL is not larger than the lower limit value LM, BGL=LM is set (Steps S44 to S46).

Figure 6:
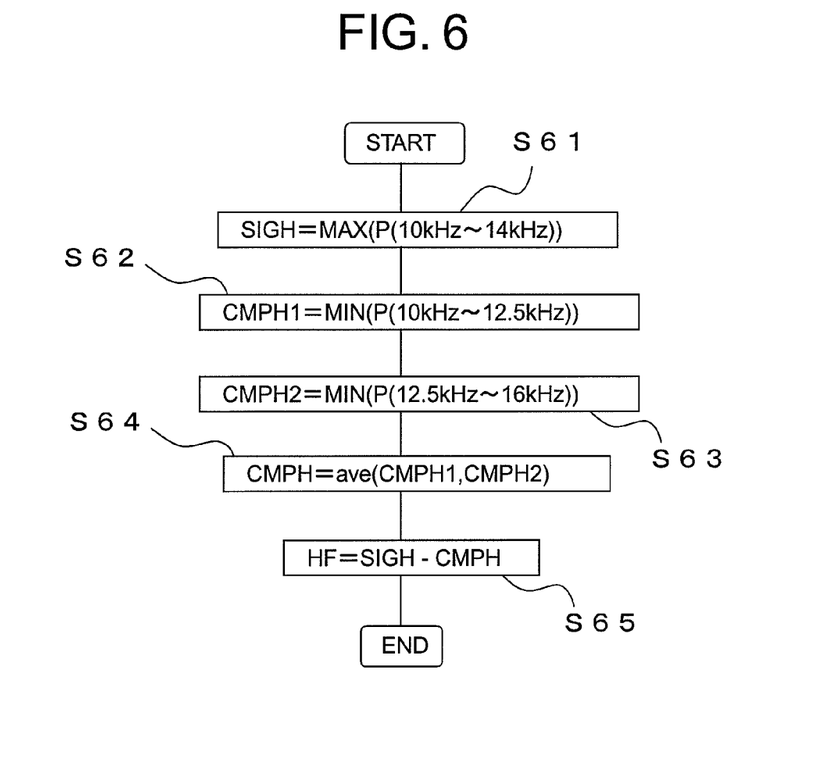
FIG. 6 is a flowchart for explaining a method of calculating a signal output of high frequency bands according to the first embodiment of the present invention.

Subsequently, a description will be given of a method of obtaining the signal output HF of the high frequency band and the signal output LF of the low frequency band referring to flowcharts shown in FIGS. 6 and 7. In the flowchart shown in FIG. 6, frequency intensities P(f) of the respective frequencies are obtained in Step S61. In this example, the frequency intensity is defined as the intensity of a frequency that has been subjected to Fourier transform. The frequency to be obtained is f=11 kHz to 14 kHz, and the frequency takes the maximum value SIGH of the respective frequency intensities P(f) of the frequencies 11 kHz to 14 kHz (Step S61).

Further, a minimum value CMPH is obtained as the comparison level of the maximum value SIGH. The minimum value CMPH is obtained as the average value ave (CMPH1, CMPH2) of the minimum value CMPH1 of the frequency intensity P(f) of f=10 kHz to 12.5 kHz and the minimum value CMPH2 of the frequency intensity P(f) of f=12.5 kHz to 16 kHz (Steps S62 to S64). The signal output HF of the high frequency band is obtained by subtracting the minimum value CMPH from the maximum value SIFH by combining those values.

Figure 7:
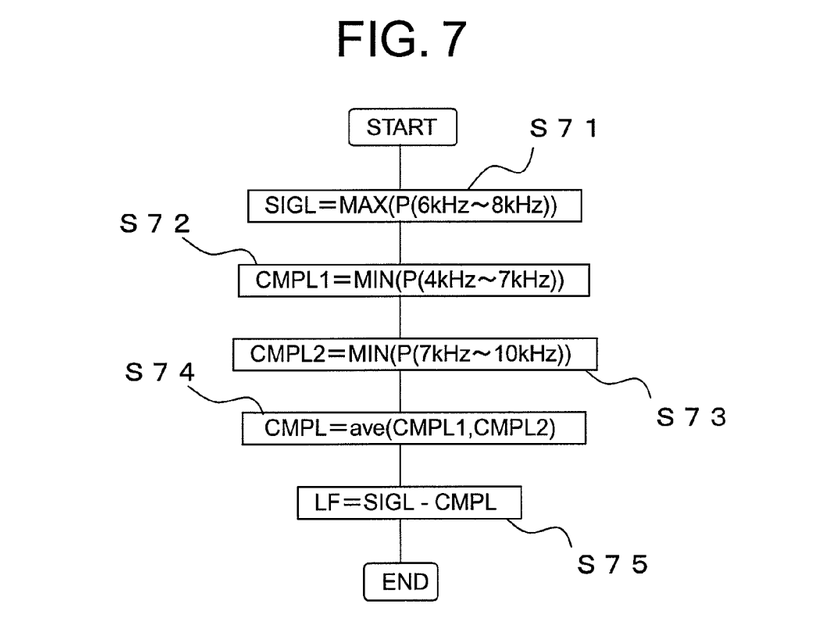
FIG. 7 is a flowchart for explaining a method of calculating a signal output of low frequency bands according to the first embodiment of the present invention.

A procedure of obtaining the signal output LF of the low frequency band is equal to that of the signal output HF of the above-mentioned high frequency band, and is only different in the subjected frequency as shown in a flowchart of FIG. 7. In the flowchart shown in FIG. 7, SIGL is the maximum value of the frequency intensity P(f) of f=6 kHz to 8 kHz, and the minimum value CMPL as the comparison level is the average value ave (CMPL1, CMPL2) of the minimum value CMPL1 of the frequency intensity P (f) of f=4 kHz to 7 kHz and the minimum value CMPL2 of the frequency intensity P(f) of f=7 kHz to 10 kHz. Also, the signal output LF of the low frequency band is obtained from subtracting the minimum value CMPL from the maximum value SIGL (Steps S71 to S75).

Figure 8A:
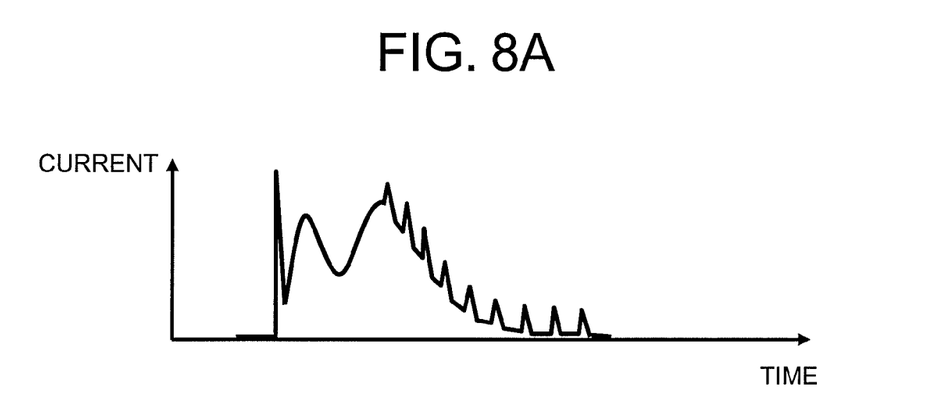
FIGS. 8A and 8B are diagrams showing a peculiar case of Fourier intensity occurrence according to the first embodiment of the present invention.
Figure 8B:
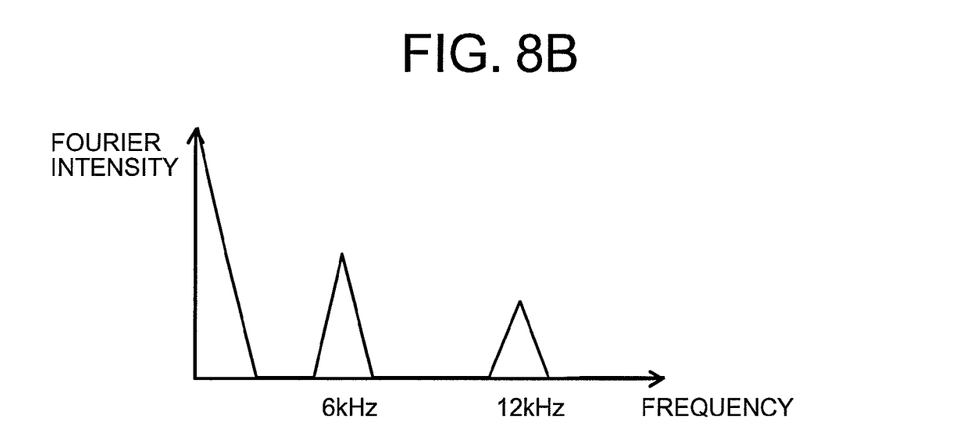

Incidentally, in the case where the vibration component that are superimposed on the ion current waveform is not a normal sine wave configuration but a configuration where only the upper portion of the amplitude exists, for example, as shown in FIG. 8A, it is found that the Fourier spectrum produces a peak at 12 kHz that is just twice of the sine wave in the case where the sine wave is 6 kHz as shown in FIG. 8B.

Accordingly, in the case where the above-mentioned status occurs, in order to prevent the erroneous determination caused by the above-mentioned status, a frequency band corresponding to twice of the frequency at which the maximum frequency intensity is generated when the signal output Lf of the low frequency band is obtained can be removed from the calculation of the maximum value SIGH when the signal output HF of the high frequency band is obtained.

As described above, according to the first embodiment of the present invention, only the case in which the truth determination is obtained in both of the vibration level of the high frequency band and the vibration level of the low frequency band is determined as knocking, that is, in the case where it is determined on the basis of the frequency intensity calculation results that at least two primary determination results from the plurality of primary knocking determination results that are obtained in the respective frequency bands have the possibility of the knocking occurrence, it is finally determined as the knocking occurrence, thereby making it possible to detect knocking with high precision. As a result, it is possible to obtain the combustion with high efficiency.

Second Embodiment

In the first embodiment described above, the calculated frequency is not particularly limited. However, it is well known that the frequency that can be calculated is uniquely determined according to the sampling period of the A/D converter in the interior of the signal processing module 4 and the number of Fourier transform. The frequency to be calculated is further selected among those frequencies, thereby enabling to readily obtain the frequency band over the wide range. This method will be described below. In the second embodiment, a specific numeric value is used for description, but it is not necessity that the actual use is not limited to the following numeric value.

First, it is assumed that the sampling period of the A/D converter in the interior of the signal processing module 4 is 25 μs (40 kHz), and the number of Fourier transform range is 64 as examples. In this state, the frequency band that can be subjected to Fourier transform is limited to the frequencies of 33 points in total from 0 Hz to 20 kHz every 625 Hz.

The Fourier transform is represented by Expression (4) below as is well known.

$$F = \Sigma(D(t) \cdot e^{j2\pi kt/T}) \tag{4}$$

where t is a time, k is the wave number, D(t) is data at a time t, T is a section length that is subjected to Fourier transform, and F is the Fourier transform of D(t).

As shown in the above-mentioned expression, data to be analyzed is multiplied by a trigonometric function value such as sin or cos which is obtained according to the time t and the wave number k, and multiplied results are sequentially integrated together. Here, depending upon frequency band to be analyzed, it can be noticed that there is a case in which the trigonometric function value, specifically the same absolute value, is taken.

Figure 9:
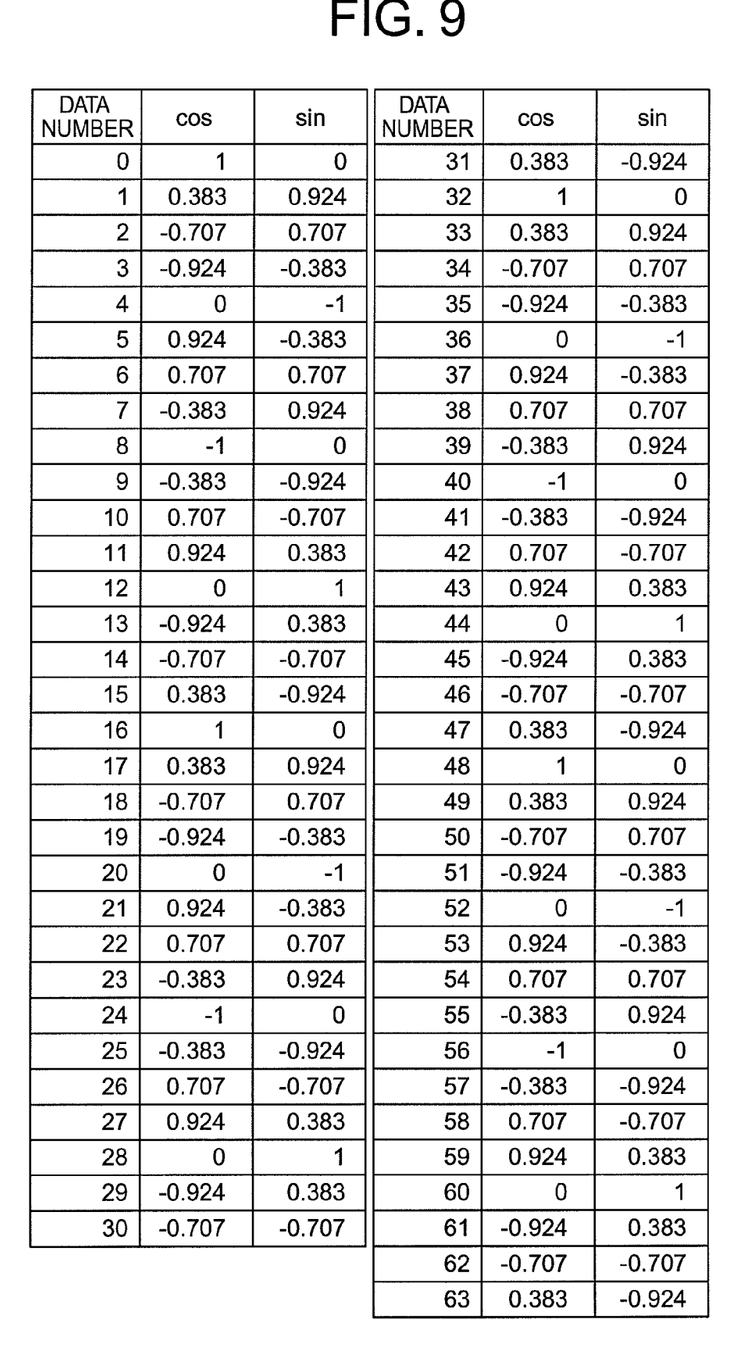
FIG. 9 is a table for explaining a Fourier intensity calculation coefficient according to a second embodiment of the present invention.

FIG. 9 represents values of sin and cos when the frequency intensity is obtained in a case where k=12 is established (corresponding to frequency of 7500 Hz in this embodiment). As a result, it is understood that the same absolute value is obtained in eight cases. For example, there are eight cases in total where absolute value of cos is 1, that is, the data numbers of 0, 8, 16, 24, 32, 40, 48, and 56.

Figure 10:
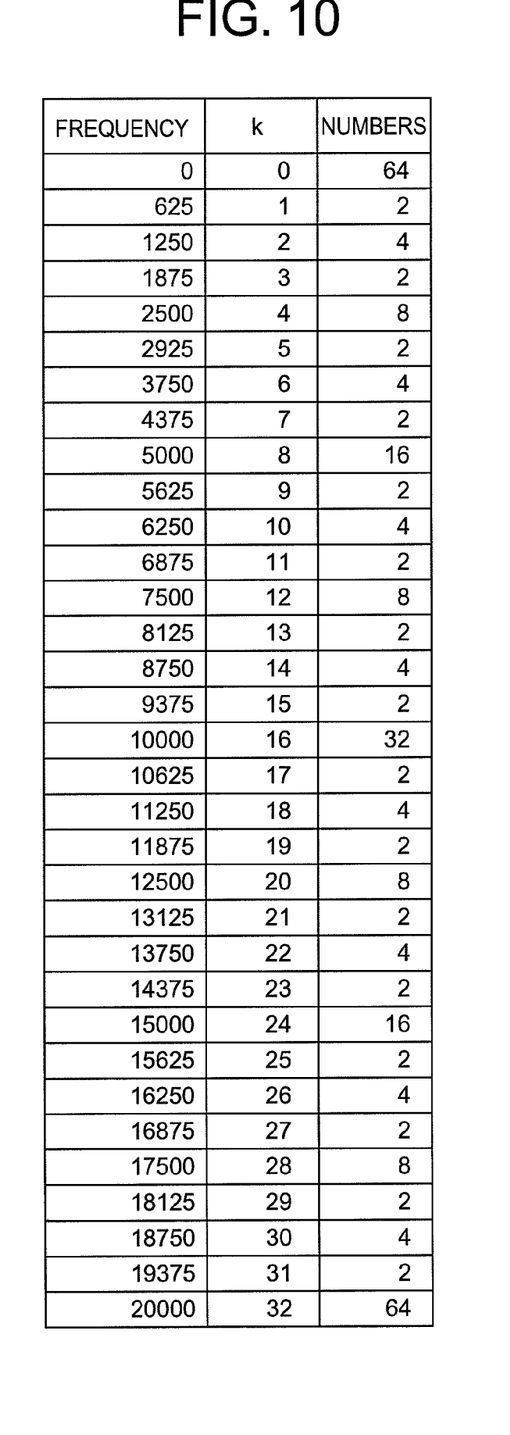
FIG. 10 is a table for explaining the pieces of data which can be calculated together in calculating the Fourier intensity according to the second embodiment of the present invention.

As described above, the number of data gathered by the frequency to be analyzed is determined, and a case in which the sampling period is 40 kHz, and the number of Fourier transform is 64 is arranged in FIG. 10. It is found that the number of Fourier transform is regular, and the number of data which is arranged at the frequency where the wave number k is an even value is large.

Therefore, in implementation of the frequency analysis, it is limited to the frequencies in which the wave number k is an even value, thereby enabling the spectrum analysis in the wide frequency band to be implemented efficiently and at high speed. In the frequency intensity calculating means in Step S22 shown in FIG. 2, when the frequency is selected, and the frequency intensity is calculated, it is possible to select an arbitrary frequency of about 3 kHz to 20 kHz as the frequency to be calculated. For example, assuming the frequency range of the first embodiment, it is possible to select 11 frequencies of 3.75 kHz, 5 kHz, 6.25 kHz, 7.5 Hz, 8.75 kHz, 10 kHz, 11.25 kHz, 12.5 kHz, 13.75 kHz, 15 kHz, and 16.25 kHz as the frequencies to be calculated.

In the case where the frequencies of the wide range as described above are calculated straightly, it is easy to imagine that the quantity of calculation 11 times as much as a case in which a single frequency is obtained is required. However, in this system, it is possible to reduce the quantity of calculation down to about 4.4 times. That is, it is possible to obtain the results with the quantity of calculation that is equal to or lower than the half of the standard quantity of calculation.

As described above, according to the second embodiment, when the frequency is selected, and the frequency intensity is calculated, the frequency to be selected is limited to a frequency whose wave number k is an even value, thereby making it to easily calculate the frequency of the wide range. Accordingly, it is possible to detect knocking with more ease and with higher precision, thereby enabling the combustion with high efficiency to be obtained.

Third Embodiment

In the above first embodiment, two bands including f=11 kHz to 14 kHz and f=6 kHz to 8 kHz are designated as the frequency intensity of knocking. However, there is a case in which a characteristic frequency that occurs at the time of generating knocking changes depending on the operation state. For example, there is a method in which only f=6 kHz to 8 kHz are designated as the knocking frequency at the time of low rotation, and f=11 kHz to 14 kHz and f=6 kHz to 8 kHz are designated at the time of high rotation. Alternatively, it is possible that f=6 kHz to 8 kHz and f=11 kHz to 14 kHz are designated as the knocking frequency at the time of a low rotation, and f=6 kHz to 8 kHz, f=11 kHz to 14 kHz, and f=17 kHz to 19 kHz are designated at the time of a high rotation. Further, there is a method in which the knocking frequency is selected to f=5 kHz to 7 kHz, f=10 kHz to 13 kHz, and f=16 kHz to 18 kHz at the time of a low load according to the load. The comparative frequency may also be changed according to the operation condition.

Figure 2:
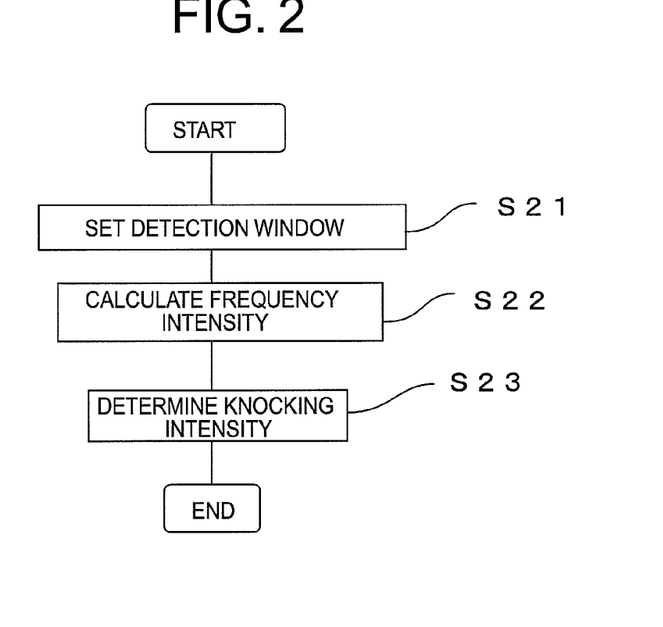
FIG. 2 is a flowchart showing main processing of a knocking detecting process according to a first embodiment of the present invention, which shows a flow of obtaining a knocking occurrence intensity from an ion current in a signal processing module shown in FIG. 1.

That is, when a plurality of frequencies are selected by the frequency intensity calculating means in Step S22 shown in FIG. 2, and the frequency intensity of the selected frequency is calculated, the knocking frequency that characteristically occurs at the time of the knocking occurrence is selected according to the operation conditions, and a comparison frequency for comparing with the knocking frequency is selected, thereby enabling the knocking to be detected with higher precision.

As described above, according to the third embodiment, the frequency to be calculated is selected according to the operation state, thereby enabling to detect the knocking with high precision. As a result, it is possible to obtain the combustion with high efficiency.

Fourth Embodiment

Figure 11:
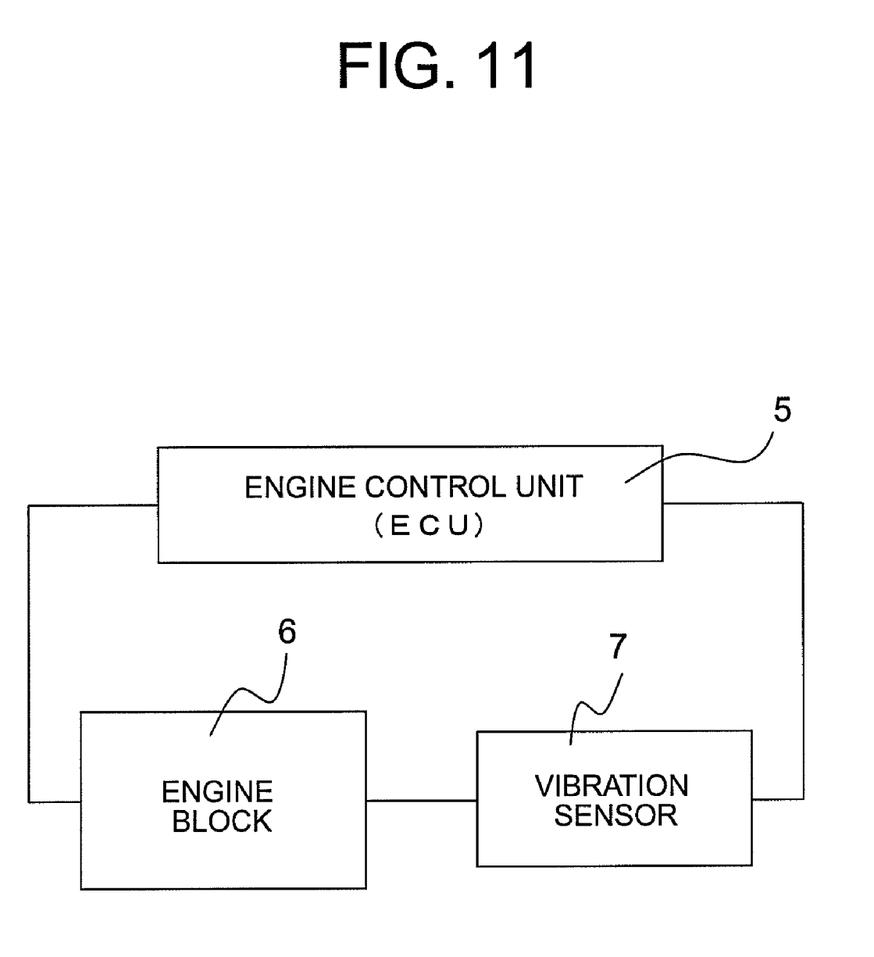
FIG. 11 is a block diagram showing a configuration of a knocking detecting device according to a fourth embodiment of the present invention.

In the above first embodiment, the ion current is used as a reference signal for detecting knocking. However, as shown in FIG. 11, the ion current can be replaced with a signal of a vibration sensor 7 that is attached to the engine block 6. Note that, because the vibration sensor 7 includes noises unique to the engine block such as a valve seat or a slap of the piston, it is necessary to remove the frequency component intensity corresponding to the natural frequency of the engine block 6 from the calculation of the signal output HF of the high frequency band or the signal output LF of the low frequency band. For example, in the case where the natural vibration frequency of the engine block 6 is close to 16 kHz, the frequency intensity between 15.5 kHz and 16.5 kHz is omitted from the calculation of the maximum value SIGH and the minimum values CMPH1 and CMPH2, to obtain the signal output HF of the high frequency band.

As described above, according to the fourth embodiment, even in the case of using the output of the vibration sensor 7 that is attached to the engine block 6, it is possible to detect the knocking with high precision. As a result, it is possible to obtain the combustion with high efficiency.

Fifth Embodiment

In the above first embodiment, the ion current is used as a reference signal for detecting knocking. Alternatively, the same effects can be obtained even through the ion current is replaced with a signal of an in-cylinder pressure sensor (not shown).

As described above, according to the fifth embodiment, even in the case where the output of the in-cylinder pressure sensor is used, knocking can be detected with high precision. Accordingly, it is possible to obtain the combustion with high efficiency.

The knocking detecting device according to the present invention is mounted to an automobile, a two-wheel vehicle, an outboard motor, or other specific machines in which the internal combustion engine is used, for realizing an improvement in the output of the engine and an improvement in the operation efficiency. Also, the knocking detecting device according to the present invention is useful for the environmental protection due to the emission reduction.

What is claimed is:

1. A knocking detecting device for an internal combustion engine, comprising:
   a signal processing module for processing a signal attributable to knocking occurring in operation of the internal combustion engine, determining a knocking occurrence intensity, and for outputting a determination result to control a timing at which an ignition coil is actuated based on the knocking occurrence intensity determined by the signal processing module, to thereby control an ignition timing at which a fuel-air mixture within a combustion chamber is ignited so as to suppress the occurrence of knocking,
   wherein the signal processing module comprises:
      a signal detecting means for detecting the signal attributable to knocking that occurs in the operation of the internal combustion engine;
      a frequency intensity calculating means for selecting a plurality of frequencies extracted from an output of the signal detecting means and for calculating a frequency intensity of each of the selected frequencies; and
      a knocking intensity determining means for determining that knocking occurs only in a case where at least two primary determination results, from among respective primary knocking determination results obtained for each of the selected frequencies, based on outputs of the frequency intensity calculating means, indicate a possibility of knocking occurrence.

2. The knocking detecting device for an internal combustion engine according to claim 1, wherein the frequency intensity calculating means selects a frequency, from among frequencies determined using a Fourier transform, wherein a wave number of the selected frequency has an even value.

3. The knocking detecting device for an internal combustion engine according to claim 2, wherein the frequency intensity calculating means selects an arbitrary frequency of about 3 kHz to about 20 kHz.

4. The knocking detecting device for an internal combustion engine according to claim 1, wherein the frequency intensity calculating means selects a knocking frequency that characteristically occurs at the time of knocking occurrence, and a comparison frequency for comparing with the knocking frequency.

5. The knocking detecting device for an internal combustion engine according to claim 4, wherein the frequency intensity calculating means selects the knocking frequency according to an operation condition of the internal combustion engine.

6. The knocking detecting device for an internal combustion engine according to claim 1, wherein the signal detecting means includes ion current detecting means for supplying a bias voltage between electrodes of an ignition plug to detect an ion current that occurs with combustion within a combustion chamber, and sets the ion current obtained by the ion current detecting means as a signal attributable to knocking.

7. The knocking detecting device for an internal combustion engine according to claim 1, wherein the signal detecting means includes vibration detecting means for detecting vibrations of the engine, and sets a vibration signal obtained by the vibration detecting means as a signal attributable to the knocking.

8. The knocking detecting device for an internal combustion engine according to claim 1, wherein the signal detecting means includes pressure detecting means for detecting pressure within a cylinder, and sets a pressure signal obtained by the pressure detecting means as a signal attributable to the knocking.

9. A signal processor comprising:
   a signal detector configured to detect a signal attributable to knocking that occurs during the operation of an internal combustion engine;
   a knocking signal processor configured to process the signal attributable to knocking;
   a first determination unit configured to determine a knocking occurrence intensity;
   an output unit configured to output a determination result to control a timing at which an ignition coil is actuated based on the knocking occurrence intensity determined by the first determination unit, to thereby control an ignition timing at which a fuel-air mixture within a combustion chamber is ignited so as to suppress the occurrence of knocking;
   a frequency intensity calculator configured to select a plurality of frequencies extracted from an output of the signal detector and to calculate a frequency intensity of each of the selected frequencies;
   a second determination unit configured to determine that knocking occurs only in a case where at least two primary determination results, from among respective primary knocking determination results obtained for each of the selected frequencies, based on outputs of the frequency intensity calculator, indicate a possibility of knocking occurrence.

10. The signal processor according to claim 9, wherein the frequency intensity calculator is configured to select a frequency, from among frequencies determined using a Fourier transform, wherein a wave number of the selected frequency has an even value.

11. The signal processor according to claim 10, wherein the frequency intensity calculator is configured to select an arbitrary frequency of about 3 kHz to about 20 kHz.

12. The signal processor according to claim 9, wherein the frequency intensity calculator is configured to select a knocking frequency that characteristically occurs at the time of knocking occurrence, and a comparison frequency for comparing with the knocking frequency.

13. The signal processor according to claim 12, wherein the frequency intensity calculator is configured to select the knocking frequency according to an operation condition of the internal combustion engine.

14. The signal processor according to claim 9, wherein the signal detector includes an ion current detector configured to supply a bias voltage between electrodes of an ignition plug to detect an ion current that occurs with combustion within a combustion chamber, and
   wherein the signal detector is configured to set the ion current obtained by the ion current detector as a signal attributable to knocking.

15. The signal processor according to claim 9, wherein the signal detector includes a vibration detector configured to detect vibrations of the engine, and
   wherein the signal detector is configured to set a vibration signal obtained by the vibration detector as a signal attributable to the knocking.

16. The signal processor according to claim 9, wherein the signal detector includes a pressure detector configured to detect pressure within a cylinder, and
   wherein the signal detector is configured to set a pressure signal obtained by the pressure detector as a signal attributable to the knocking.

* * * * *